Nov. 7, 1944.   E. M. SMITH   2,362,031
ANIMAL TRAP
Filed May 31, 1943

INVENTOR.
ESTHER M. SMITH.
BY Archworth Martin
her ATTORNEY.

Patented Nov. 7, 1944

2,362,031

UNITED STATES PATENT OFFICE 2,362,031

ANIMAL TRAP

Esther M. Smith, Pittsburgh, Pa., assignor of one-half to Archworth Martin, Pittsburgh, Pa.

Application May 31, 1943, Serial No. 489,124

5 Claims. (Cl. 43—81)

My invention relates to that form of trap wherein a base board is provided upon which is mounted a bait holder and trigger, and a spring pressed jaw that is tripped to catch and hold a mouse or other animal upon the board, after the manner of ordinary mouse traps.

One object of my invention is to provide a handle-like attachment whereby the trap, after it has been baited and "set" can conveniently be placed upon the floor at a desired location, with minimum danger of the trap being accidentally sprung, thus avoiding danger of the operator's fingers being struck by the jaw and also avoiding startling or frightening the operator, as often occurs when a trap is accidentally sprung while being held in the hand.

Another object of my invention is to provide a handle of the character referred to which can also be utilized as a lever to raise a spring jaw, to release a mouse or other animal that has been caught in the trap.

A further object of my invention is to provide a handle or lever of the character referred to that can readily be applied to standard forms of traps.

Figure 1:
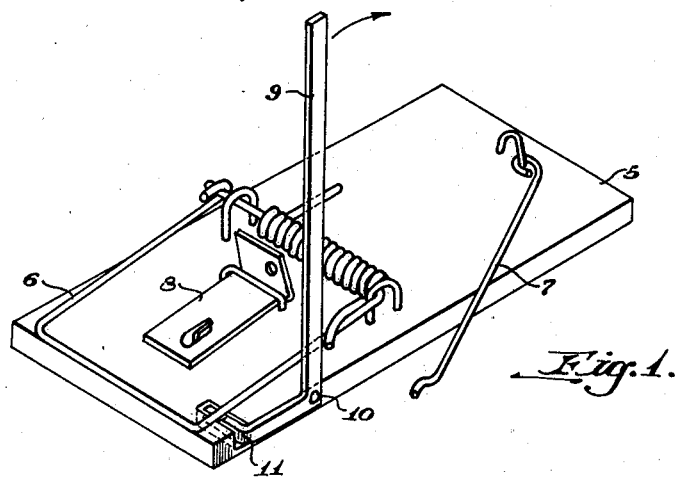
Figure 2:
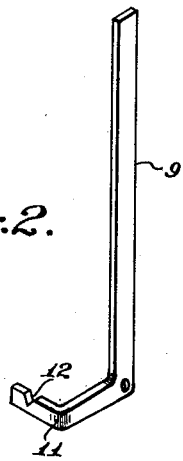
Figure 3:
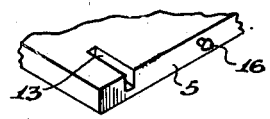
Figure 4:
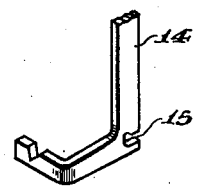

Some of the forms which my invention may take are shown in the accompanying drawing, wherein Figure 1 is a perspective view of a trap to which my invention is applied; Fig. 2 is a detail view of the handle, and Figs. 3 and 4 are fragmentary views of modified forms of a base and a lever, respectively.

The numeral 5 designates an ordinary base which may conveniently be of wood. A jaw 6 is pivotally mounted upon the board 5 and will be snapped to animal-catching position by the usual spring. Also, a setting bar or latch 7 is provided for holding the jaw in its rearward tensioned position, and a trigger and bait holder 8. These parts are all of well known form and operate in the usual manner.

My invention comprises the attachment to the trap of a lever or handle 9 that has an upright arm portion and is pivotally supported on the base at 10. The handle has a foot portion which is provided with a lateral extension at 11 that serves to raise the jaw 6 and thus release an animal, when the lever 9 is swung in the direction indicated by the arrow. The extension at 11 has a notch 12 whereby the jaw is prevented from slipping off the extension during raising of the jaw. The lever can be swung to lift the jaw either while the trap is on the floor or after picking up the trap. In the latter case the thumb could be placed against the front side of the lever while the rear or remote end of the base is held by the other fingers of the hand. In this way a mouse could conveniently be shaken clear of the trap. The base is shown as notched or grooved to receive the extension at 11 and thus avoid interference with close engagement of the jaw with the base. This notch would not be essential if the extension were flattened and made sufficiently wider to have the required strength to raise the jaw against the spring tension. The pivot stud at 10 may have a head or not, depending upon whether it is to support the lever for easy removal.

The handle or lever 9 is made of such length that it can conveniently be used for a handle for setting the trap on the floor after it has been baited and "set," the length of the upright arm being such that the jaw would not hit the finger of the user if it should become released while placing the trap on the floor. This is an important feature, because owing to the thin base boards of traps it is difficult to set them on the floor and release them from the hand without a jar or shock that causes them to become sprung.

In Figs. 3 and 4, I show a modification wherein the lever 14 is of a somewhat different form than the lever 9. In this case the lever 14 has a notch or bayonet slot 15 whereby it can conveniently be slid on or removed from a pivot stud 16 on the edge of the base 5, and has its lateral extension normally lying in a slot 13 in the base. The handle 14 can easily be removed to facilitate packing and storing of the traps and could also be removed where the trap is to be placed under an article of furniture that is too low for the handle 14.

In both Figs. 1 and 3 it will be seen that the pivot stud 10 or 16 is set a considerable distance forwardly of the middle of the trap so that the weight of the trap when lifted will tend to swing it clockwise relative to the handle, against the extension at 11 so that the trap can be lifted by the handle without idle swinging movement.

I claim as my invention:

1. The combination with a mouse trap having a base, a U-shaped striker jaw pivotally mounted intermediate the length of the base, a trigger and a latch, of a lifting lever for the striker jaw, of L formation, having an arm substantially vertically-extending relative to the base and a foot portion normally lying in parallel relation to and at the outer side of one edge of the base, the intersection of the arm and foot being pivoted on the edge of the base, at a point intermediate the pivot of the jaw and the base of the U when the jaw is in released position, said foot having an extension therefrom projecting inwardly from said edge of the base, said base having a groove therein and said foot extension being normally positioned within the groove and underlying a part of the U shaped jaw.

2. The combination with a mouse trap having a base, a U-shaped striker jaw pivotally mounted intermediate the length of the base, a trigger and a latch, of a lifting lever for the striker jaw, of L formation, having an arm substantially vertically-extending relative to the base and a foot portion normally lying in parallel relation to and at the outer side of one edge of the base, the intersection of the arm and foot being pivoted on the edge of the base, at a point intermediate the pivot of the jaw and the base of the U when the jaw is in released position, said foot having an extension therefrom projecting inwardly from said edge of the base, and beneath the jaw, and said extension having means to prevent lateral displacement of the jaw from the extension.

3. The combination with a mouse trap having a base, a U-shaped striker jaw pivotally mounted intermediate the length of the base, a trigger and a latch, of a lifting lever for the striker jaw, of L formation, having an arm substantially vertically-extending relative to the base and a foot portion normally lying in parallel relation to and at the outer side of one edge of the base, the intersection of the arm and foot being pivoted on the edge of the base, at a point intermediate the pivot of the jaw and the base of the U when the jaw is in released position, said foot having an extension therefrom projecting inwardly from said edge of the base, said base having a groove therein and said foot extension being normally positioned within the groove and underlying a part of the U-shaped jaw, the upper edge of the foot, including its extension, being flush with the upper face of the base when in normal position.

4. The combination with a mouse trap having a base, a U-shaped striker jaw pivotally mounted intermediate the length of the base, a trigger and a latch, of a lifting lever for the striker jaw, of L formation, having an arm substantially vertically-extending relative to the base and a foot portion normally lying in parallel relation to and at the outer side of one edge of the base, the intersection of the arm and foot being pivoted on the edge of the base, at a point intermediate the pivot of the jaw and the base of the U when the jaw is in released position, said foot having an extension therefrom projecting inwardly from said edge of the base, said base having a groove therein and said foot extension being normally positioned within the groove and underlying a part of the U-shaped jaw, in which structure a plane, including the arm and a major portion of the foot is substantially at right angles to the extension of the foot.

5. The combination with a mouse trap having a base, a U-shaped striker jaw pivotally mounted intermediate the length of the base, a trigger and a latch, of a lifting lever for the striker jaw, of L formation, having an arm substantially vertically-extending relative to the base and a foot portion normally lying in parallel relation to and at the outer side of one edge of the base, the intersection of the arm and foot being pivoted on the edge of the base, at a point intermediate the pivot of the jaw and the base of the U when the jaw is in released position, said foot having an extension therefrom projecting inwardly from said edge of the base, said base having a groove therein and said foot extension being normally positioned within the groove and underlying a part of the U-shaped jaw, the total weight of that portion of the trap on the side of the pivot to which the lever is attached being greater than the total weight of that portion of the trap to the other side of the pivot, when the jaw is in set position, whereby lifting of the trap and suspending the same from the hand of an operator, while gripping a portion of the arm will maintain the trap in balanced and stable position relative to the lever arm.

ESTHER M. SMITH.